(12) United States Patent
Depraete et al.

(10) Patent No.: US 11,339,861 B2
(45) Date of Patent: May 24, 2022

(54) TURBINE ASSEMBLY, HYDROKINETIC TORQUE CONVERTER, AND METHODS FOR MAKING THE SAME

(71) Applicant: VALEO KAPEC CO., LTD., Daegu (KR)

(72) Inventors: Alexandre Depraete, Bloomfield, MI (US); Gyubong Jeon, Troy, MI (US); Xuexian Yin, Troy, MI (US); Subramanian Jeyabalan, Troy, MI (US)

(73) Assignee: VALEO KAPEC CO., LTD., Daegu (KR)

( * ) Notice: Subject to any disclaimer, the term of this patent is extended or adjusted under 35 U.S.C. 154(b) by 37 days.

(21) Appl. No.: 17/121,203

(22) Filed: Dec. 14, 2020

(65) Prior Publication Data

US 2021/0148444 A1 May 20, 2021

Related U.S. Application Data

(62) Division of application No. 15/471,617, filed on Mar. 28, 2017, now Pat. No. 10,865,864.

(51) Int. Cl.
*F16H 41/28* (2006.01)
*F16H 45/02* (2006.01)

(52) U.S. Cl.
CPC ............. *F16H 41/28* (2013.01); *F16H 45/02* (2013.01); *F16H 2045/0231* (2013.01)

(58) Field of Classification Search
CPC ...... F16H 41/28; F16H 45/02; F16H 45/0231; F16D 33/20
See application file for complete search history.

(56) References Cited

U.S. PATENT DOCUMENTS

| | | | | |
|---|---|---|---|---|
| 2,749,710 A | * | 6/1956 | Russell | F16H 61/60 60/345 |
| 2,762,197 A | | 9/1956 | Ullery | |
| 2,944,402 A | | 7/1960 | Russell | |
| 3,023,582 A | * | 3/1962 | Ryan | F16D 33/20 60/338 |
| 5,465,575 A | * | 11/1995 | Shimmell | F16H 41/28 60/362 |
| 5,505,590 A | * | 4/1996 | Dohring | F16H 41/28 416/244 R |

(Continued)

*Primary Examiner* — Brian P Wolcott
(74) *Attorney, Agent, or Firm* — Berenato & White, LLC

(57) ABSTRACT

A method of making a turbine assembly for a hydrokinetic torque converter includes providing a first turbine component including a polymeric first turbine shell element and first turbine blades connected to the first turbine shell element, providing a second turbine component including a second turbine shell element and second turbine blades connected to the second turbine shell element, and connecting the first turbine shell element to the second turbine shell element to collectively provide a turbine shell of the turbine assembly and fixedly secure the first and second turbine components to one another in a coaxial relationship about the rotational axis. The connecting involves welding and/or adhesive bonding the first turbine shell element to the second turbine shell element. A turbine assembly, a hydrokinetic torque converter, and a method of making a hydrokinetic torque converter are also provided.

11 Claims, 13 Drawing Sheets

(56) References Cited

U.S. PATENT DOCUMENTS

| | | | | |
|---|---|---|---|---|
| 5,813,505 | A * | 9/1998 | Olsen | F16H 45/02 |
| | | | | 192/3.29 |
| 6,296,445 | B1 * | 10/2001 | Chasseguet | F16H 41/28 |
| | | | | 416/213 R |
| 6,378,676 | B1 | 4/2002 | Chasseguet et al. | |
| 6,428,276 | B1 * | 8/2002 | Chasseguet | F16H 45/02 |
| | | | | 416/180 |
| 8,162,612 | B2 | 4/2012 | Brees | |
| 2017/0241529 | A1 | 8/2017 | Depraete | |
| 2017/0241530 | A1 | 8/2017 | Jeyabalan et al. | |
| 2018/0283515 | A1 | 10/2018 | Depraete et al. | |

\* cited by examiner

TURBINE ASSEMBLY, HYDROKINETIC TORQUE CONVERTER, AND METHODS FOR MAKING THE SAME

CROSS-REFERENCE TO RELATED APPLICATIONS AND CLAIM TO PRIORITY

This application is a division of U.S. patent application Ser. No. 15/471,617, filed Mar. 28, 2017, the complete disclosure of which is incorporated herein by reference and to which priority is claimed.

BACKGROUND OF THE INVENTION

1. Field of the Invention

The present invention generally relates to coupling devices, and preferably to turbine assemblies for hydrokinetic torque converters, hydrokinetic torque converters including the turbine assemblies, and methods of making and using the same.

2. Background of the Invention

Typically, a hydrokinetic torque converter includes an impeller assembly, a turbine assembly, and a stator assembly (or reactor). The stator assembly typically includes a one-way clutch for restricting rotational direction. The turbine assembly is operatively connected, such as by using fasteners or by integral connection, with an output (or turbine) hub that is linked in rotation to a driven shaft, which operates as or is linked in rotation to an input shaft of a transmission of a vehicle. The casing of the torque converter generally includes a front cover and an impeller shell, which together define a fluid filled chamber. Impeller blades are fixed to an impeller shell within the fluid filled chamber to define the impeller assembly. The turbine assembly and the stator are also disposed within the chamber, with both the turbine assembly and the stator being relatively rotatable with respect to the front cover and the impeller shell. The turbine assembly includes a turbine shell with a plurality of turbine blades fixed to one side of the turbine shell facing the impeller blades of the impeller.

The turbine assembly works together with the impeller assembly, which is linked in rotation to the casing that is itself linked in rotation to a driving shaft driven by an internal combustion engine. The stator is interposed axially between the turbine assembly and the impeller assembly.

Conventionally, the turbine shell and the turbine blades are usually formed by stamping from steel blanks. The turbine shell is typically slotted to receive, through the slots, tabs of the turbine blades. After the turbine blades are located within the turbine shell, the turbine blade tabs are bent or rolled over to form mechanical attachments to the turbine shell. A brazing process is typically carried out to secure the turbine blades fixed in position.

Current hydrokinetic torque converters and methods for assembly thereof may be complex, cumbersome and expensive. Therefore, while conventional hydrokinetic torque converters, including but not limited to those discussed above, have proven to be acceptable for vehicular driveline applications and conditions, improvements that may enhance their performance and cost are possible.

BRIEF SUMMARY OF THE INVENTION

A first aspect of the invention provides a method of making a turbine assembly for a hydrokinetic torque converter. The method includes providing a first turbine component including a polymeric first turbine shell element and first turbine blades connected to the first turbine shell element, providing a second turbine component including a second turbine shell element and second turbine blades connected to the second turbine shell element, and connecting the first turbine shell element to the second turbine shell element to collectively provide a turbine shell of the turbine assembly and fixedly secure the first and second turbine components to one another in a coaxial relationship about the rotational axis. The connecting involves welding and/or adhesive bonding the first turbine shell element to the second turbine shell element.

According to a second aspect of the present invention, a turbine assembly for a hydrokinetic torque converter is provided. The turbine assembly includes a first turbine component including a polymeric first turbine shell element and first turbine blades connected to the first turbine shell element, and a second turbine component including a second turbine shell element and second turbine blades connected to the second turbine shell element. The first turbine shell element is fixedly secured by a connection to the second turbine shell element in a coaxial relationship to collectively provide a turbine shell of the turbine assembly. The connection comprises a weld, an adhesive bond, or a combination comprising a weld and an adhesive bond.

A third aspect of the present invention provides a method of making a hydrokinetic torque converter. The method includes providing a first turbine component including a polymeric first turbine shell element and first turbine blades connected to the first turbine shell element, providing a second turbine component including a second turbine shell element and second turbine blades connected to the second turbine shell element, and connecting the first turbine shell element to the second turbine shell element to collectively provide a turbine shell of the turbine assembly and fixedly secure the first and second turbine components to one another in a coaxial relationship about the rotational axis. The connecting involves welding and/or adhesive bonding the first turbine shell element to the second turbine shell element. The turbine assembly is operatively secured to an impeller including an impeller shell whereby the turbine assembly is coaxially aligned with and hydro-dynamically drivable by the impeller assembly. The turbine assembly is operatively connected to a turbine hub. A torsional vibration damper is operatively connected to the turbine hub and to a lockup clutch that is movable into and out of locking engagement with a casing of the hydrokinetic torque converter, wherein the casing is non-rotatable relative to the impeller shell.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
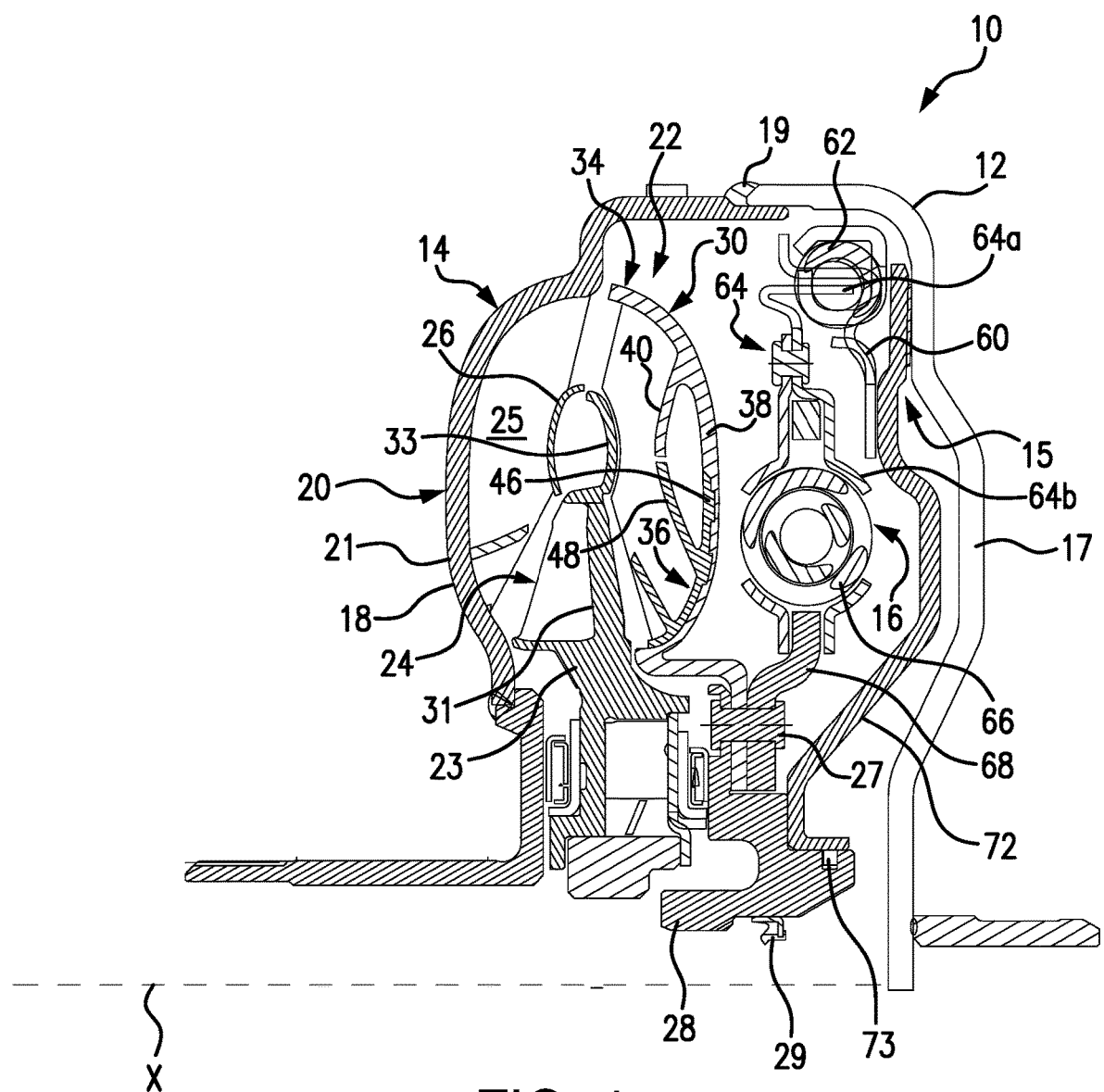
FIG. 1 is a half view in axial section of a hydrokinetic torque converter with a turbine assembly in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description.

A first exemplary embodiment of a hydrokinetic torque coupling device is generally represented in FIG. 1 by reference numeral 10. The hydrokinetic torque coupling device 10 is configured and intended to couple a driving shaft and a driven shaft, for example of a motor vehicle, to one another. In the case of such a motor vehicle, the driving shaft is typically an output shaft of an internal combustion engine (not shown) of the motor vehicle and the driven shaft is typically connected to an automatic transmission (not shown) of the motor vehicle.

The hydrokinetic torque coupling device 10 comprises a sealed casing 12 and a hydrokinetic torque converter 14, each rotatable about a rotational axis X. The casing 12 is filled with a fluid, such as oil or transmission fluid. A lock-up clutch 15 and a torsional vibration damper (also referred to herein as a damper assembly) 16 are situated in the casing 12. The torsional vibration damper assembly 16 and the torque converter 14 are mounted on an output (turbine) hub 28, as discussed in greater detail below. The sealed casing 12, the torque converter 14, the lock-up clutch 15, and the torsional vibration damper 16 are all rotatable about the rotational axis X. Most of the drawings discussed herein show half-views, that is, a cross-section of the portion or fragment of the hydrokinetic torque coupling device 10 above the rotational axis X. Hereinafter the axial and radial orientations are considered with respect to the rotational axis X of the hydrokinetic torque coupling device 10. Relative terms such as "axially," "radially," and "circumferentially"

are with respect to orientations parallel to, perpendicular to, and circularly around the rotational axis X, respectively.

The sealed casing 12 according to the first exemplary embodiment as illustrated in FIG. 1 includes a first casing shell 17, and a second casing shell 18 disposed coaxially with and axially opposite to the first casing shell 17. The first and second casing shells 17 and 18 are non-movably (i.e., fixedly relative to one another) interconnected and sealed together about their outer peripheries, such as by weld 19. The sealed casing 12 is non-movably (i.e., fixedly) connected to the driving shaft, more typically to a flywheel (not shown) that is non-rotatably fixed to the driving shaft, so that the casing 12 turns at the same speed at which the engine operates for transmitting torque. Specifically, the casing 12 is rotatably driven by the internal combustion engine by fixedly coupling the casing 12 to the flywheel of the engine, such as by using studs (not shown). Typically, the studs are fixedly secured, such as by welding, to the first casing shell 17. Each of the first and second casing shells 17 and 18 is integral or a one-piece member. The shells 17 and 18 each can be made, for example, by press-forming a metal sheet.

The torque converter 14 includes an impeller assembly (sometimes referred to as the pump or impeller wheel) 20, a turbine assembly (sometimes referred to as the turbine wheel) 22, and a stator assembly (sometimes referred to as the reactor) 24 interposed axially between radially inner portions of the impeller assembly 20 and the turbine assembly 22. The impeller assembly 20, the turbine assembly 22, and the stator assembly 24 are coaxially aligned with one another about the rotational axis X. The impeller assembly 20, the turbine assembly 22, and the stator assembly 24 collectively form a torus. In operation, the impeller assembly 20 and the turbine assembly 22 are fluidly (or hydrodynamically) coupled to one another as is known in the art.

The torque coupling device 10 also includes a substantially annular turbine (or output) hub 28 (FIGS. 1 and 13) rotatable about the rotational axis X. The turbine hub 28 is configured to couple the driven shaft (not shown) and the turbine assembly 22 to one another so that the driven shaft and the turbine assembly 22 are non-rotatable relative to one another. For example, the turbine hub 28 may include splines or teeth for engaging complementary splines or teeth of the driven shaft. A sealing member 29, mounted to a radially inner peripheral surface of the turbine hub 28, is configured to create a seal at the interface of the driven (transmission input) shaft and the turbine hub 28.

The impeller assembly 20 includes a substantially annular, semi-toroidal (concave) impeller shell 21, a substantially annular impeller core ring 26, and a plurality of impeller blades 25 fixedly (i.e., non-moveably) attached, such as by brazing, to the impeller shell 21. A portion of the second casing shell 18 of the casing 12 also forms and serves as the impeller shell 21 of the impeller assembly 20. Accordingly, the impeller shell 21 sometimes is referred to as part of the casing 12 with respect to exemplary embodiments. The impeller assembly 20, including the impeller shell 21, the impeller core ring 26, and the impeller blades 25, is non-rotatably secured to the first casing shell 17 by the weld 19, and hence to the drive shaft (or flywheel) of the engine to rotate at the same speed as the engine output. The impeller shell 21, the impeller blades 25, and the impeller core ring 26 may be conventionally formed by stamping from steel blanks. Alternatively, the impeller shell 21, the impeller blades 25, and/or the impeller core ring 26 may be molded from one or more polymeric materials, for example, by practicing injection molding. The impeller shell 21 and blades 25 may be molded as a single integral piece.

The turbine assembly 22 includes a substantially annular turbine shell 30 rotatable about the rotational axis X, and pluralities of radially outer turbine blades 40 and radially inner turbine blades 48 fixedly (i.e., non-moveably) secured to the turbine shell 30. The turbine blades 48 face the impeller blades 25 of the impeller assembly 20. The turbine shell 30 includes a radially inner, substantially annular mounting portion 44 with circumferentially spaced mounting holes 45 for receiving mechanical fasteners, such as rivets 27, to non-movably (i.e., fixedly) secure the turbine assembly 22 to the turbine hub 28.

The stator assembly 24 includes a substantially annular stator hub 23 coaxial to the rotational axis X, a substantially annular turbine core ring 33 also coaxial to the rotational axis X and located radially outside the stator hub 23, and a plurality of stator blades 31 interconnecting the stator hub 23 and the turbine core ring 33. The turbine core ring 33 is curved in a semi-toroidal cross-section and faces the impeller core ring 26. The turbine core ring 33 of the stator assembly 24 has an inner concave surface facing the impeller core ring 26 and an opposite outer convex surface facing and spaced from the turbine blades 40 and 48. The turbine core ring 33 may be formed at the radially outer ends of the stator blades 31. In particular, the stator hub 23, the turbine core ring 33, and the stator blades 31 may be formed as a single integral piece by molding, e.g., injection mold, a polymer material.

The turbine assembly 22 includes an outer turbine component 34 and an inner turbine component 36 arranged coaxial with one another and rotatable about the rotational axis X. The outer turbine component 34 preferably is a separately formed from the inner turbine component 36, and later connected to the inner turbine component 36 so that the turbine components 34 and 36 are secured non-moveably relative to one another. The outer turbine component 34 has an outer radius (or diameter) that is larger than an outer radius (or diameter) of the inner turbine component 36. Moreover, as best shown in FIGS. 1, 2, 6 and 7, each of the radially outer turbine blades 40 of the outer turbine component 34 has an inner radius that is not smaller than an outer radius of the radially inner turbine blades 48 of the inner turbine component 36.

Figure 2:
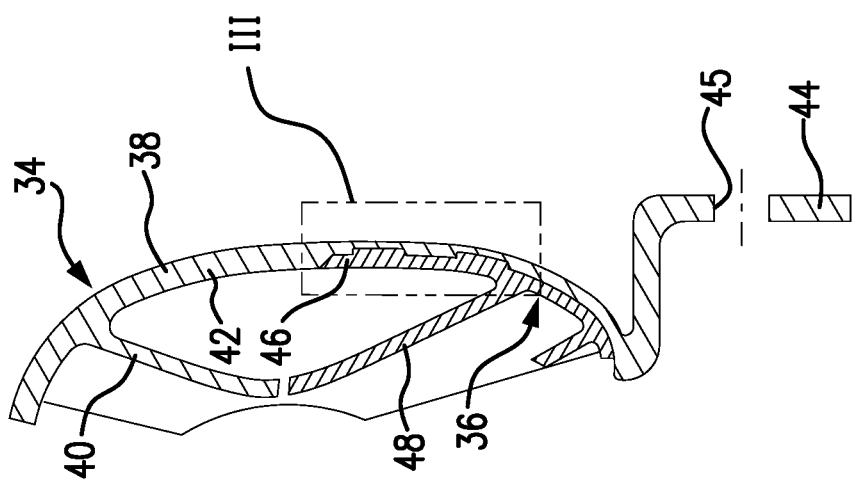
FIG. 2 is a half view in axial section of the turbine assembly of the hydrokinetic torque converter shown in FIG. 1.
Figure 12:
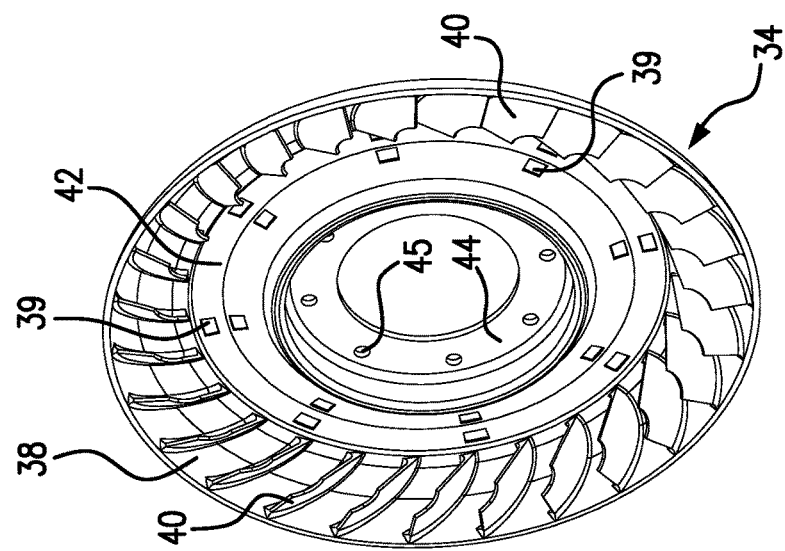
FIG. 12 is a side perspective view of another component of the turbine assembly of the first exemplary embodiment of the invention in a preassembled and pre-welded state.
Figure 11:
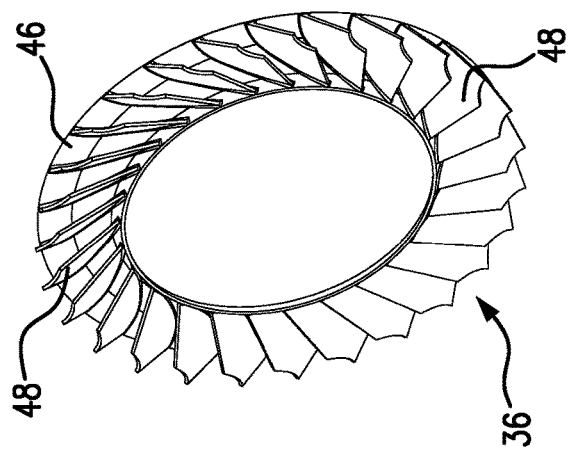
FIG. 11 is an opposite side perspective view of the turbine assembly component of FIG. 9.
Figure 13:
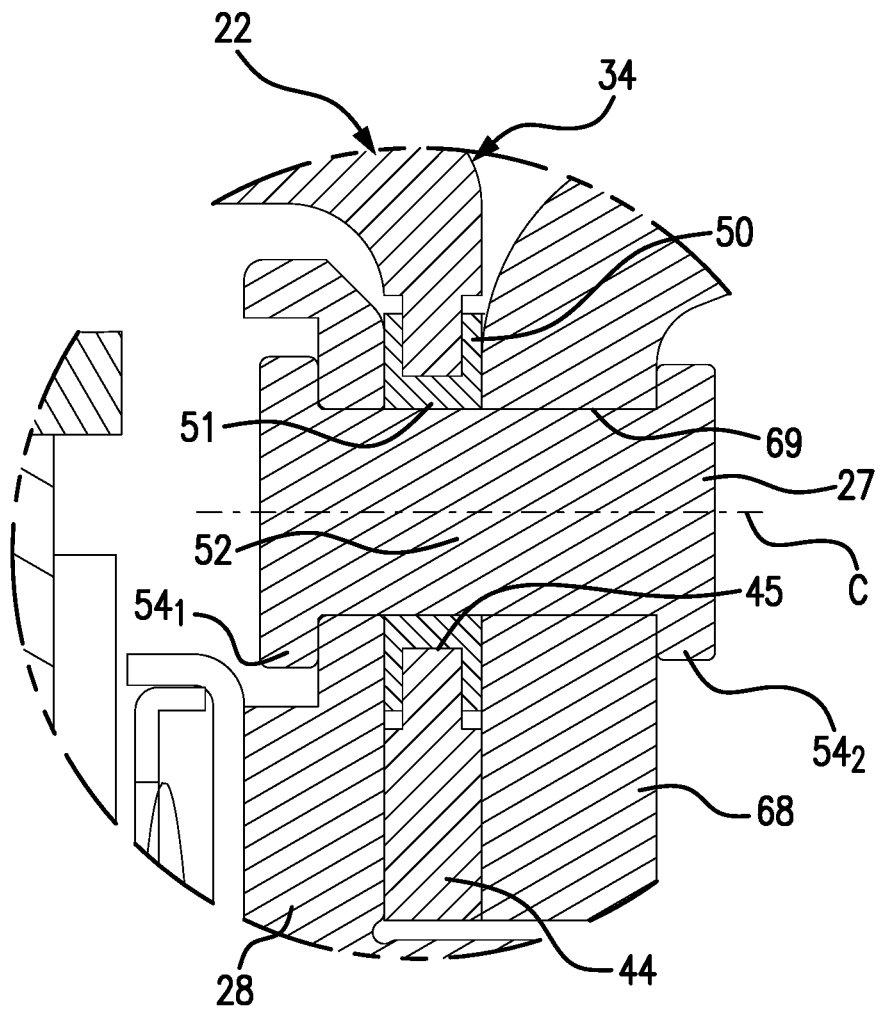
FIG. 13 is a sectional fragmented view of a modification of the first exemplary embodiment that may be practiced in combination with each of the embodiments described herein.

The outer turbine component 34 includes a substantially annular outer turbine shell element 38 and a plurality of radially outer turbine blades 40 extending to face toward the impeller blades 25. Thus, the outer turbine blades 40 and the inner turbine blades 48 are arranged to face toward the impeller blades 25, i.e., toward the same axial direction. In a preferred embodiment, the outer turbine shell element 38 is integrally formed with the radially outer turbine blades 40 as a single or unitary (i.e., one-piece) outer turbine component 34. Alternatively, the outer turbine shell element 38 and the radially outer turbine blades 40 may be separate components fixedly (i.e., non-moveably relative to one another) connected together. The outer turbine shell element 38 has a substantially semi-toroidal portion 42 and the substantially annular mounting portion 44 located radially within the substantially semi-toroidal portion 42. The mounting portion 44 of the outer turbine shell element 38 is provided with the plurality of equiangular circumferentially spaced mounting holes 45, as best shown in FIGS. 2, 12, and 13. The mounting holes 45 are circumferentially equiangularly spaced. Fasteners such as rivets 27 extending through the mounting holes 45 fixedly secure the outer turbine shell element 38 to the turbine hub 28.

In a modified embodiment illustrated in FIG. 13, each of the mounting holes 45 is circumscribed by a grommet 50.

The grommets 50 are mounted to the mounting portion 44 of the outer turbine shell element 38 around the mounting holes 45 as a reinforcement, so that each of the rivets 27 axially extends through an opening 51 in one of the grommets 50 in order to non-movably (i.e., fixedly) secure the turbine shell 30 of the turbine assembly 22 to the turbine hub 28. Each of the grommets 50 includes a cylindrical portion 52, and two axially opposite annular flanges $54_1$ and $54_2$ extending radially outwardly from the cylindrical portion 52 of the grommet 50. A central axis C of the cylindrical portion 52 is substantially parallel to the rotational axis X. The flanges $54_1$ and $54_2$ of the grommet 50 are axially spaced from each other to provide a gap therebetween for receiving the mounting portion 44 of the outer turbine shell element 38 around the mounting holes 45. The mounting portion 44 of the outer turbine shell element 38 is sandwiched between the annular flanges $54_1$ and $54_2$ of the grommet 50 so that the annular flanges $54_1$ and $54_2$ engage axially opposite sides of the mounting portion 44 of the outer turbine shell element 38. The grommets 50 may be made of a rigid material, such as metal, plastic or polymer. For example, the grommets 50 may be made of steel, such as SAE 1020 carbon steel, which has a good combination of strength and ductility and may be hardened or carburized, and is readily cold worked by conventional methods. The outer turbine component 34 may be made of a polymer molded around the outer periphery of the grommets 50. Alternatively, grommet installation tools, which are known in the art, may be used, particularly if the outer turbine component is made of metallic material such as aluminum or magnesium alloys.

The inner turbine component 36 preferably is formed separately from the outer turbine component 34. The inner turbine component 36 includes a substantially annular inner turbine shell element 46 and a plurality of radially inner turbine blades 48. The radially inner turbine blades 48 preferably are integral with and extend from an annular, substantially semi-toroidal (concave) inner surface of the inner turbine shell element 46 so as to face toward the impeller blades 25 of the impeller assembly 20. Preferably, the inner turbine shell element 46 and the radially inner turbine blades 48 are made as a single or unitary (i.e., one-piece) component. Alternatively, the inner turbine shell element 46 and the radially inner turbine blades 48 may be separate components fixedly (i.e., non-moveably relative to one another) connected together.

In the first exemplary embodiment, at least a portion of the inner turbine shell element 46 is made of a polymeric material. The polymeric material may be molded into form using any suitable technique, including, for example, injection molding. In the first exemplary embodiment, the outer turbine component 34 and/or the remainder of the inner turbine component 36 may be made of metal or polymer. It is particularly advantageous to mold or otherwise shape the turbine components 34 and 36 into unitary polymeric components in order to remove the need for brazing processes practiced in connection with metallic components that slow and complicate production.

The outer and inner turbine components 34 and 36 are fixedly connected to one another to provide the turbine assembly 22. In a preferred embodiment, the outer and inner turbine shell elements 38 and 46 are assembled and fixedly connected via welding, adhesive bonding, or a combination including at least welding and adhesive bonding to collectively establish the turbine shell 30 of the turbine assembly 22.

Welding, particularly ultrasonic welding, is preferred for connecting the inner and outer turbine shell elements 38 and 46 to one another, especially when the elements 38, 46 are formed of a polymeric material. Generally, ultrasonic welding involves application of high-frequency ultrasonic acoustic vibrations to local areas (described below) of the turbine shell elements 38 and 46 being held together, typically with the application of pressure, to create a solid-state weld. Although ultrasonic welding is principally described herein in connection with the first exemplary embodiment and other exemplary embodiments, it should be understood that other techniques may be practiced to connect the inner and outer turbine shell elements 38 and 46 to one another in a fixedly secure manner, including for example laser welding, friction spot welding, and/or adhesive bonding. In a preferred welding embodiment, no mechanical fasteners, soldering materials, or adhesives are necessary or used to connect the welded inner and outer turbine shell elements 38 and 46 together.

Figure 3:
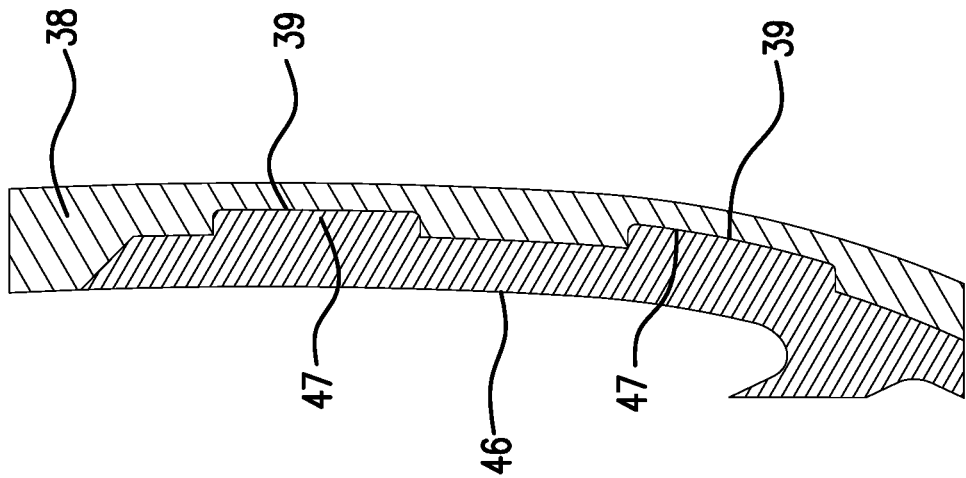
FIG. 3 is an enlarged view of a fragment the turbine assembly shown in the box III of FIG. 2.
Figure 5:
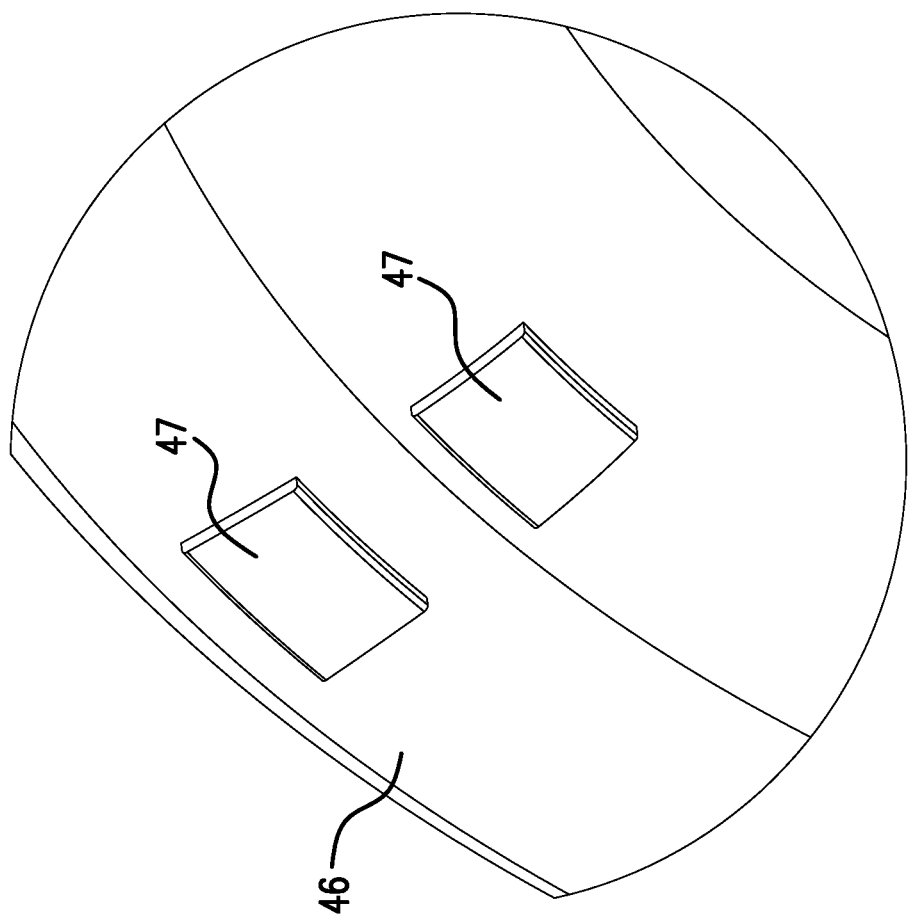
FIG. 5 is an enlarged view of a fragment of the turbine assembly component shown in circle V of FIG. 4.
Figure 4:
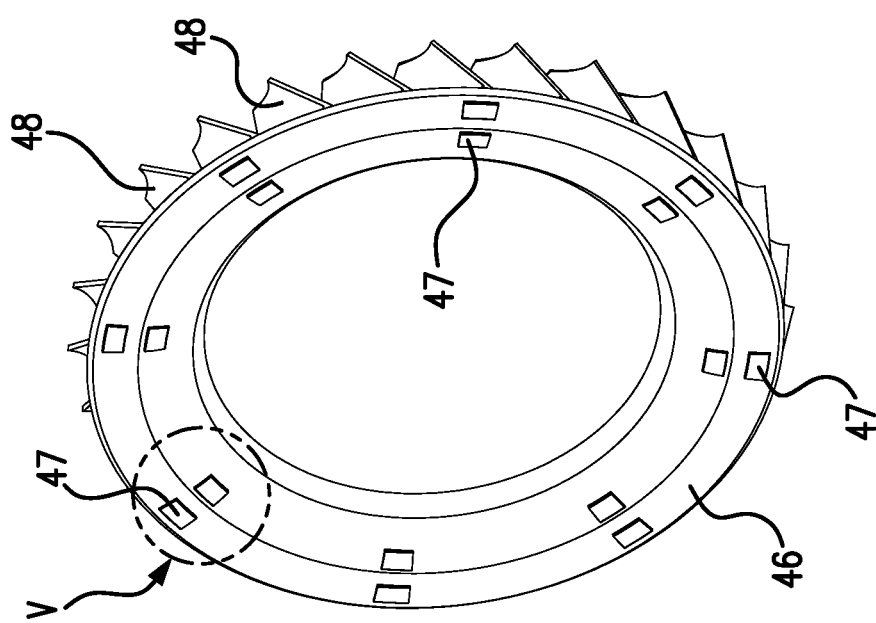
FIG. 4 is a perspective view of a component of the turbine assembly of the hydrokinetic torque converter of FIG. 1.

FIG. 3 shows local areas of radially overlapping portions of the inner and outer turbine shell elements 38 and 46 at which ultrasonic welding has occurred. The outer turbine shell element 38 includes recessed areas (or recesses) 39, and the inner turbine shell element 46 includes tabs 47 received in and solid-state welded to the recessed areas 39. As best shown in FIG. 4, the tabs 47 may be circumferentially equiangularly spaced around the rear surface of the inner turbine shell element 46. In FIGS. 4 and 5, the tabs 47 are in pairs of two, with each set of two tabs aligned along a common radial line. Alternatively, three, four, or more tabs 47 may be aligned together along the same radial line. As another alternative, only a single tab 47 may be located along a given radial line. Each of the tabs 47 is aligned with and received by a corresponding one of the recessed areas 39.

Figure 8:
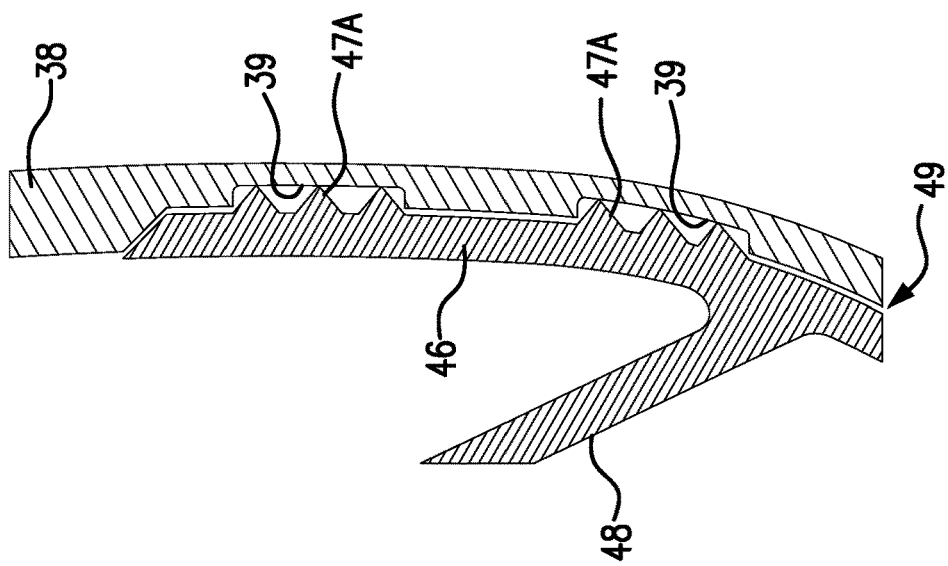
FIG. 8 is an enlarged view of a fragment of the turbine assembly shown in the box VIII of FIG. 7.
Figure 7:
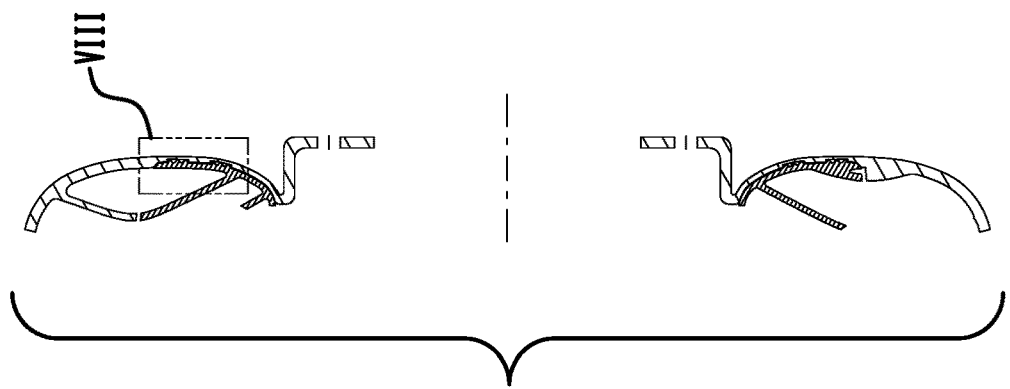
FIG. 7 is a full view in axial section of the turbine assembly of FIG. 6 in an assembled yet pre-welded state.
Figure 6:
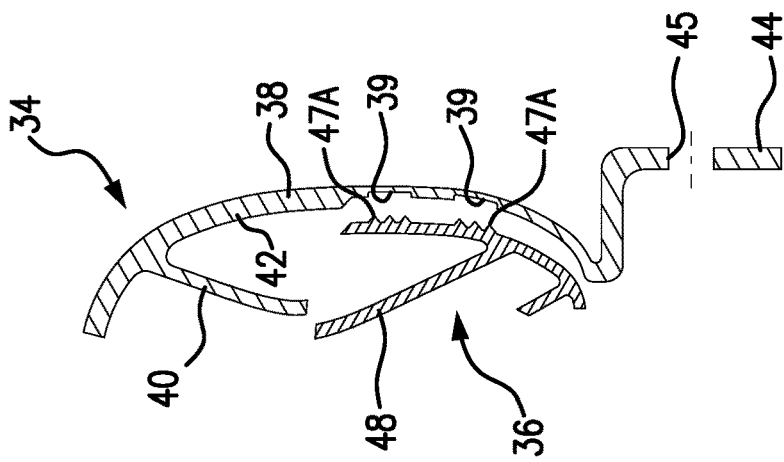
FIG. 6 is a side sectional view of the turbine assembly of the first exemplary embodiment shown in a pre-assembled state.
Figure 10:
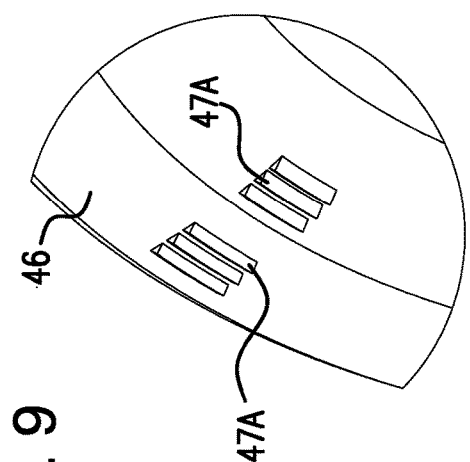
FIG. 10 is an enlarged view of a fragment of the turbine assembly component shown in circle X of FIG. 9.
Figure 9:
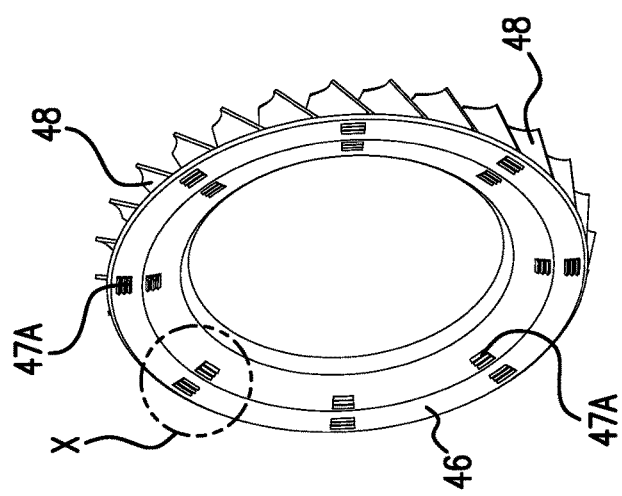
FIG. 9 is a side perspective view of a component of the turbine assembly of the first exemplary embodiment in a preassembled and pre-welded state.

FIGS. 6-12 illustrate the inner and outer turbine components 34 and 36 prior to being welded and/or bonded to one another, such as by ultrasonic welding. As best shown in FIGS. 6-10, particularly FIG. 10, prior to (ultrasonic) welding the tabs 47 are configured as molded protuberances 47A on a side surface of the inner turbine shell element 46 facing the outer turbine shell element 38. The protuberances 47A are in corresponding positions to the recesses 39 of the outer turbine shell element 38 that receive the protuberances 47A. As best shown in FIGS. 8 and 10, the protuberances 47A are each embodied in the first exemplary embodiment as parallel ridges separated by small inverse ridge-like, V-shaped spaces (unnumbered). The protuberances 47A have a thickness that is slightly greater than the depth of the recesses 39, so that the facing surfaces of the overlapping portions of the inner and outer turbine shell elements 38 and 46 are spaced from one another by a small gap 49 (FIG. 8) prior to welding.

Welding the inner turbine shell element 46 at local areas corresponding to the locations of the protuberances 47A causes the ridges of the protuberances 47A to soften and optionally melt. Pressure applied to opposite surfaces of the inner and outer turbine shell causes elements 38 and 46 to collapse the small gap 49 as the protuberances 47A reshape into the tabs 47 to conform to the shape of the recesses 39. The tabs 47 are then cooled and harden.

In the first exemplary embodiment, the inner turbine shell element 46, and more preferably the entirety of the inner turbine component 36, is made of one or more polymers that can be subject to ultrasonic welding to reshape the protuberances 47A into the tabs 47, as described above. Examples of suitable polymeric materials for the inner turbine component 36 are polyetheretherketone (PEEK), such as a carbon-fiber reinforced grade PEEK, a commercially available example of which is KetaSpire® KT-880 CF30. Preferably, the inner turbine shell element 46 and the radially inner turbine blades 48 of the inner turbine component 36 are integrally formed with one another as a single piece. For example, the inner turbine component 36 may be made by a suitable molding process, such as injection molding the inner turbine shell element 46 and the inner turbine blades 48 in a common mold.

In the first exemplary embodiment, the outer turbine component 34 is not subject to deformation. Accordingly, the outer turbine component 34 may be made of metal (e.g., aluminum or magnesium alloys) and/or polymeric material, such as the PEEK material discussed above. In this manner, the same or different materials can be selected for the outer turbine component 34 and the inner turbine component 36 to provide the turbine components 34 and 36 with the same or different mechanical characteristics, such as strengths, specific weights, densities, moduli of elasticity, melting points, etc.

As shown by comparing FIGS. 3 and 8, the inner turbine shell element 46 is made of a polymeric material in order to allow it to be reshaped and/or reformed in the welding process, particularly at the protuberances 47A, which are reshaped and/or reformed as the tabs 47 that fill and are welded to the recesses 39. On the other hand, the outer turbine shell element 38 is not necessarily reshaped and/or reformed in the welding process, particularly at the recesses 39 that receive the protuberances 47A that are welded to form the tabs 47, and thus can be made of metal or polymeric materials.

Molding of the outer and/or inner turbine components 34 and/or 36 provides wide latitude in controlling the thickness of the turbine components 34 and/or 36. For example, the outer turbine shell element 38 or the inner turbine shell element 46 can have thicknesses that varies at different radial positions. The outer and inner turbine shell element 38 and 46 may have thicknesses that differ from the thicknesses of the radially outer and radially inner turbine blades 40 and 48, respectively. The thicknesses of the radially outer turbine blades 40 or the radially inner turbine blades 48 may vary. The capability to control thickness provides the possibility for mass optimization by increasing thickness at locations where greater strength is needed and reducing thickness where strength is not needed to thereby reduce the overall weight of the turbine assembly 22. Further, molding provides the option of providing the molded turbine assembly 22 with molded reinforcing ribs.

Referring back to FIG. 1, the torsional vibration damper 16 advantageously allows the turbine assembly 22 of the torque converter 14 to be coupled, with torque damping, to the input shaft of the automatic transmission.

The torsional vibration damper 16, as best shown in FIG. 1, is disposed between the turbine shell 30 and a locking piston 72 of the lock-up clutch 15. The locking piston 72 of the lock-up clutch 15 is rotatably mounted on the turbine hub 28, and is axially moveable on the turbine hub 28 along the rotational axis X. A seal 73 is provided along the interface of the locking piston 72 and the turbine hub 28. The torsional vibration damper 16 is arranged on the turbine hub 28 in a limited, movable and centered manner.

The lockup clutch 15 includes a locking piston 72 that is axially movably by controlling fluid pressure within the casing 12. Controlling locking piston movement is known in the art. In a locking position, the locking piston 72 frictionally engages an inner surface of the first casing shell 17, so that the locking piston 72 rotates with the casing 12.

The locking piston 72 inputs torque to the torsional vibration damper 16 when the device 10 operates in lockup mode. As best shown in FIG. 1, the torsional vibration damper 16 includes a substantially annular input member 60 operatively connected to the locking piston 72 so as to be non-rotatable relative to one another. The annular input member 60 includes tabs 60a that engage ends of radially outer, circumferentially extending elastic members 62. The damper 16 further includes an intermediate member 64 having radially outer tabs 64a engaging ends of the elastic members 62. The intermediate member 64 further includes radially inner tabs proximate to 64b engaging ends of radially inner, circumferentially extending elastic members 66. The elastic members 66 elastically couple the intermediate member 64 to an output member 68, which has tabs engaging ends of the elastic members 66. In this setup, the annular input member 60 is rotatably relative to the intermediate member 64, and the intermediate member 64 is rotatably relative to the output member 68 for torsional vibration damping.

When the lock-up clutch 15 is active, i.e., in a closed operative position, torque is transferred from the first casing shell 17, to the locking piston 72, to the annular input member 60, to the radially outer elastic members 62, to the intermediate member 64, to the radially inner elastic members 66, to the output member 68, and to the output hub 28 to which the output member 68 is fixedly attached by rivets 27. The elastic members 62 and 66 provide a damping effect. According to the exemplary embodiment, the elastic members 62 and 66 are configured as helical (or coil) springs having a principal axis oriented substantially circumferentially. Other elastic members may be selected to replace or supplement the elastic members 62 and 66.

On the other hand, when the lock-up clutch 15 is inactive, i.e., in an open operative position, the locking piston 72 is not fictionally engaged with the first casing shell 17. Torque is hydrokinetically transferred through the torque converter 14 to the output hub 28, which is fixedly attached to the turbine assembly 22 by rivets 27.

As best shown in the embodiment of FIG. 13, the output member 68 is provided with a plurality of equiangular circumferentially spaced holes 69. The output member 68 is fixedly (i.e., non-movably) secured to the turbine hub 28 and the mounting portion 44 of the turbine shell 30 by the rivets 27 extending through the holes 69 in the output member 68, aligned holes (unnumbered) of the turbine hub 28, and the aligned mounting holes 45 of the mounting portion 44.

A method for making the turbine assembly 22 and the hydrokinetic torque coupling device 10 of the first exemplary embodiment is described below. It should be understood that this exemplary method may be practiced in connection with the other embodiments described herein. This exemplary method is not the only method for assembling the turbine assemblies and hydrokinetic torque coupling devices described herein, and is not exhaustive of possible modifications and variations that may be practiced. While the methods for assembling the turbine assemblies and hydrokinetic torque coupling devices may be practiced by successively performing the steps as set forth below, it should be understood that the methods may involve performing the steps in different sequences, or combining steps, adding steps not described herein, or eliminating steps described herein.

As described above, each of the grommets 50 has the cylindrical portion 52 and two axially opposite annular flanges $54_1$ and $54_2$ extending radially outwardly from the cylindrical portion 52 of the grommet 50. The outer turbine component 34 may be made by injection molding the plastic material integrally with the grommets 50, thus molding the plastic material over and around the cylindrical portion 52 of the grommets 50 so as to sandwich the mounting portion 44 of the outer turbine component 34 between the two axially opposite annular flanges $54_1$ and $54_2$ of the grommets 50. Alternatively, a grommet installation tool may be used to attached the grommets 50 to the outer turbine component 34. The inner turbine component 36 preferably is made separately from the outer turbine component 34, for example, by molding plastic.

The inner turbine shell element 46 of the inner turbine component 36 is axially aligned and non-moveably connected to the outer turbine shell element 38 of the outer turbine component 34. Preferably, the inner and outer turbine shell elements 46 and 38 are directly connected one another by welding, such as ultrasonic welding or friction welding. As an alternative, the inner and outer turbine shell elements 46 and 38 may be directly bonded to one another, for example by use of an appropriate adhesive within the recesses 39. The connected turbine shell elements 38 and 46 collectively define the turbine shell 30 of the turbine assembly 22.

An exemplary method for making the hydrokinetic torque-coupling device 10 is as follows.

The impeller assembly 20, the stator assembly 24, and the damper assembly 16 may each be preassembled. Parts of the impeller assembly 20 and the stator assembly 24 may be formed, for example, by stamping from metal (e.g., steel) blanks or injection molding a polymeric material. The turbine assembly 22 is assembled as described above.

The impeller assembly 20, the turbine assembly 22, and the stator subassembly 24 are assembled together so as to form the torque converter 14. The damper assembly 16 and the turbine hub 28 are fastened to the mounting portion 44 of the turbine shell 30 of the torque converter 14 via the fasteners, e.g., rivets 27. In the modified embodiment of FIG. 13, each of the rivets 27 axially extends through the associated opening 51 in one of the grommets 50 overmolded in the turbine shell 30. The locking piston 72 is fitted about the output hub 28 and radially outer tabs of the input member 60 are engaged with the radially outer elastic members 62. Then, the first casing shell 17 is non-moveably and sealingly secured, such as by welding at 19, to the second casing shell 18, as best shown in FIG. 1.

Various modifications, changes, and alterations may be practiced with the above-described embodiment, including but not limited to the additional embodiments shown in FIGS. 14-31. In the interest of brevity, reference characters discussed above in connection with the first exemplary embodiment of FIGS. 1-12 and the modified embodiment of FIG. 13 are not further elaborated upon below, except to the extent necessary or helpful to explain the additional embodiments of FIGS. 14-31. Where useful, modified components and parts of the second, third, and fourth exemplar embodiments are indicated by the addition of 100, 200, and 300 hundred digits, respectively, to the reference numerals of the components, parts, or features.

A hydrokinetic torque-coupling device 110 of a second exemplary embodiment is illustrated in FIGS. 14-25. In the second exemplary embodiment, a turbine assembly 122 replaces the turbine assembly 22 of FIGS. 1-13. Other than the substitution of the turbine assembly 122, the hydrokinetic torque coupling device 110 of the second exemplary embodiment is substantially the same in structure and operation as the hydrokinetic torque coupling device 10 of the first exemplary embodiment.

The turbine assembly 122 includes an outer turbine component 134 and an inner turbine component 136 coaxial with one another and rotatable about the rotational axis X. The outer turbine component 134 preferably is a separately formed from and later connected to the inner turbine component 136 so that the turbine components 134 and 136 are secured non-moveably relative to one another. The outer turbine component 134 has an outer radius (or diameter) that is larger than an outer radius (or diameter) of the inner turbine component 136.

Figure 14:
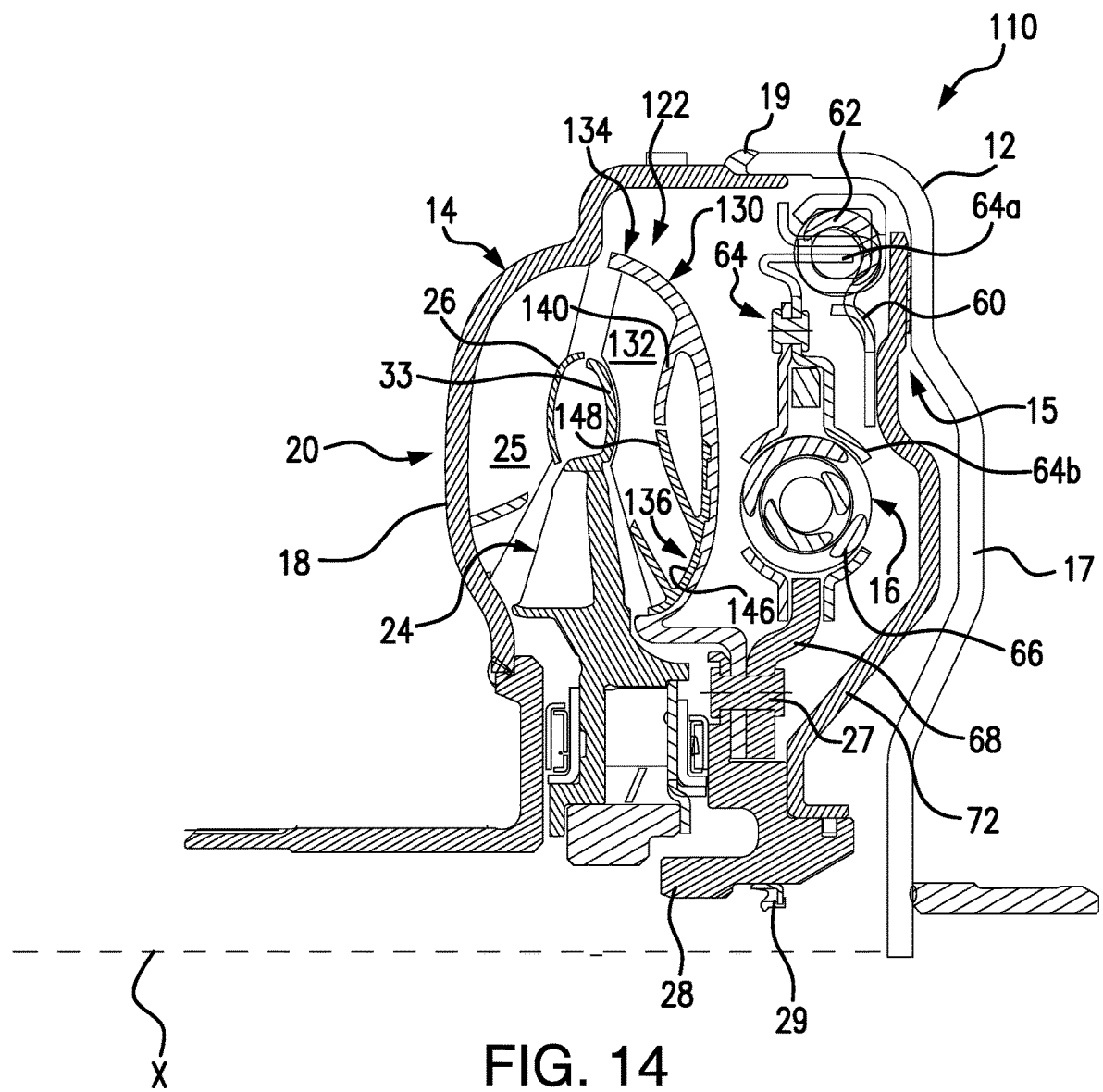
FIG. 14 is a half view in axial section of a hydrokinetic torque converter with a turbine assembly in accordance with a second exemplary embodiment of the present invention.
Figure 15:
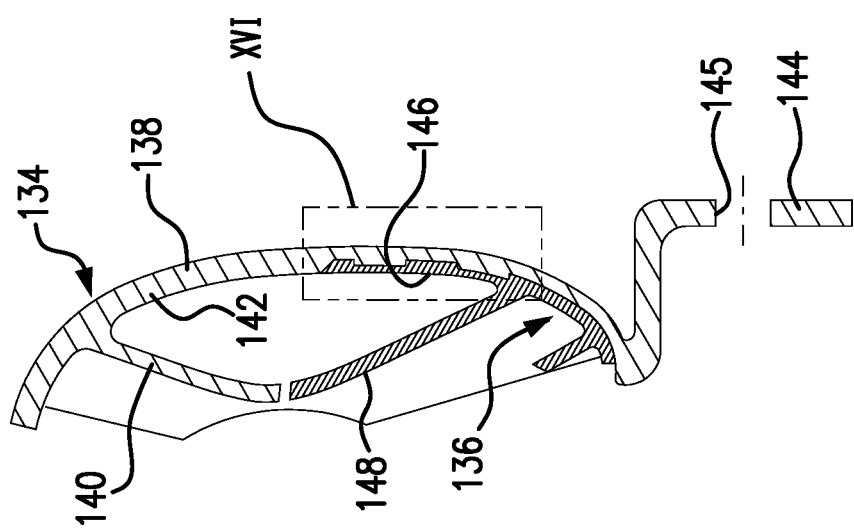
FIG. 15 is a half view in axial section of the turbine assembly of the hydrokinetic torque converter shown in FIG. 14.
Figure 18:
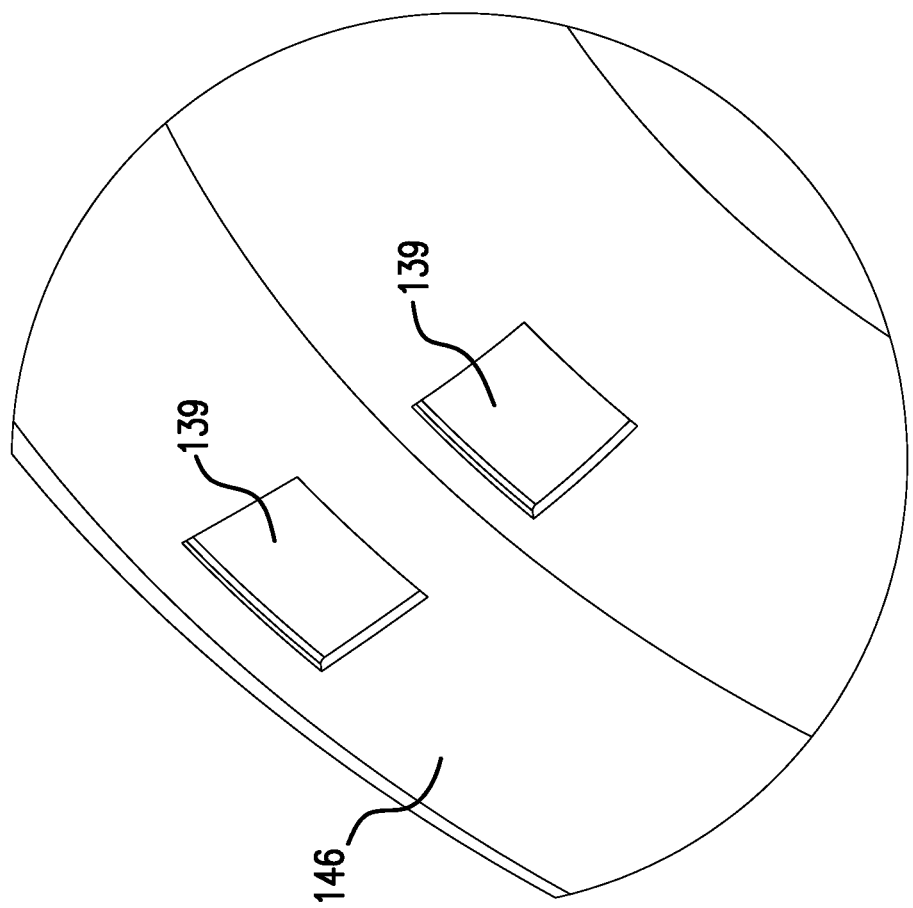
FIG. 18 is an enlarged view of a fragment of the turbine assembly component shown in circle XVIII of FIG. 17.
Figure 25:
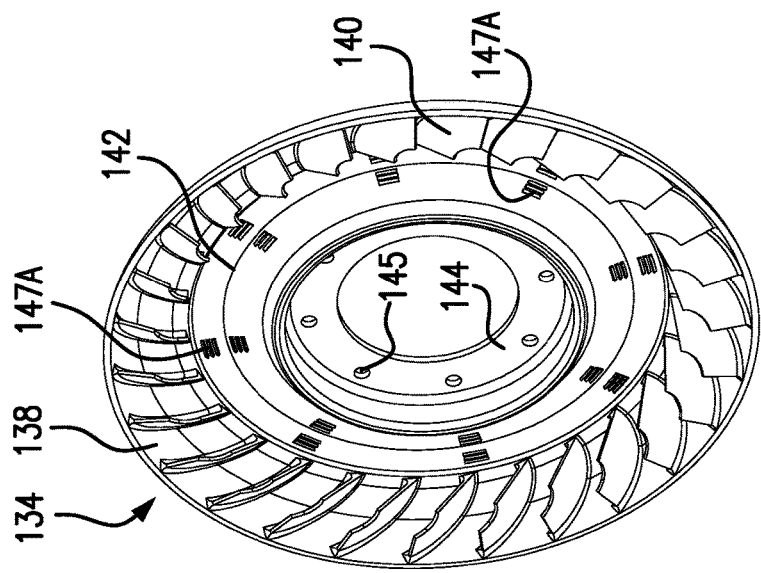
FIG. 25 is a side perspective view of another component of the turbine assembly of the second exemplary embodiment of the invention in a preassembled and pre-welded state.
Figure 24:
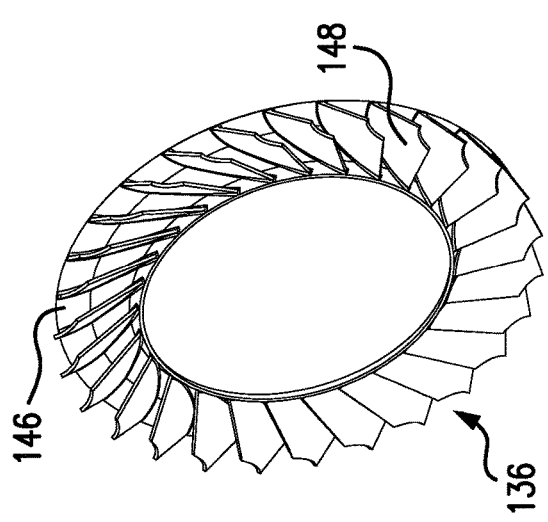
FIG. 24 is an opposite side perspective view of the turbine assembly component of FIG. 23.
Figure 23:
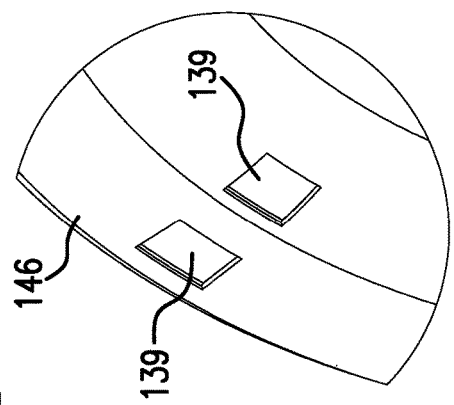
FIG. 23 is an enlarged view of a fragment of the turbine assembly component shown in circle XXIII of FIG. 22.

The outer turbine component 134 includes a substantially annular outer turbine shell element 138 and a plurality of radially outer turbine blades 140 extending to face toward the impeller blades 25. In a preferred embodiment, the outer turbine shell element 138 is integrally formed with the radially outer turbine blades 140 as a single or unitary (i.e., one-piece) outer turbine component 134. Alternatively, outer turbine shell element 138 and the radially outer turbine blades 140 may be separate components fixedly (i.e., non-moveably relative to one another) connected together. The outer turbine shell element 138 has a substantially semi-toroidal portion 142 and a substantially annular mounting portion 144 located radially within the substantially semi-toroidal portion 142. The mounting portion 144 of the outer turbine shell element 138 is provided with a plurality of equiangular circumferentially spaced mounting holes 145, as best shown in FIGS. 14, 15, and 25. The mounting holes 145 are circumferentially equiangularly spaced. Fasteners such as rivets 27 extending through the mounting holes 145 fixedly secure the outer turbine shell element 138 to the turbine hub 28. Grommets 50 may be used as discussed above, especially in reference to FIG. 13.

The inner turbine component 136 preferably is formed separately from the outer turbine component 134 and includes a substantially annular inner turbine shell element 146 and a plurality of radially inner turbine blades 148. The radially inner turbine blades 148 are integral with and extend from an annular, substantially semi-toroidal (concave) inner surface of the inner turbine shell element 146 so as to face toward the impeller blades 25 of the impeller assembly 20. Preferably, the inner turbine shell element 146 and the radially inner turbine blades 148 are made as a single or unitary (i.e., one-piece) component. Alternatively, the inner turbine shell element 146 and the radially inner turbine blades 148 may be separate components fixedly (i.e., non-moveably relative to one another) connected together.

In the second exemplary embodiment, at least a portion of the outer turbine shell element 138 is made of a polymeric material. The polymeric material may be molded into shape using any suitable technique, such as, for example, injection molding. In the second exemplary embodiment, the inner turbine component 136 and/or the remainder of the outer turbine component 134 may be made of metal or polymer. It is particularly advantageous to mold or otherwise shape the turbine components 134 and 136 into unitary polymeric components in order to remove the need for brazing processes that slow and complicate production.

The outer and inner turbine components 134 and 136 are fixedly connected to one another to provide the turbine assembly 122. In a preferred embodiment, the outer and inner turbine shell elements 138 and 146 are assembled and connected in a fixed (non-movable) connection via welding, adhesive bonding, or a combination including at least welding and adhesive bonding to collectively establish the turbine shell 130 of the turbine assembly 122.

Welding, particularly ultrasonic welding, is preferred for connecting the outer and inner turbine shell elements 138 and 146 to one another. Generally, ultrasonic welding involves application of high-frequency ultrasonic acoustic vibrations to local areas (described below) of the turbine shell elements 138 and 146 being held together, typically with the application of pressure, to create a solid-state weld. Although ultrasonic welding is principally described herein in connection with the second exemplary embodiment and other exemplary embodiments, it should be understood that other welding and bonding techniques may be practiced to connect the outer and inner turbine shell elements 138 and 146 to one another in a fixedly secured manner, including for example laser welding, friction spot welding, and/or adhesive bonding. In a preferred welding embodiment, no mechanical fasteners, soldering materials, or adhesives are necessary or used to connect the welded turbine shell elements 138 and 146 together.

Figure 16:
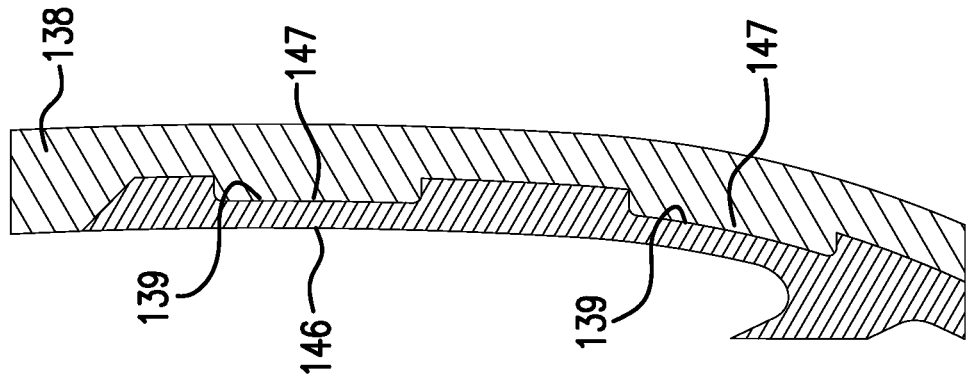
FIG. 16 is an enlarged view of a fragment the turbine assembly shown in the box XVI of FIG. 15.
Figure 17:
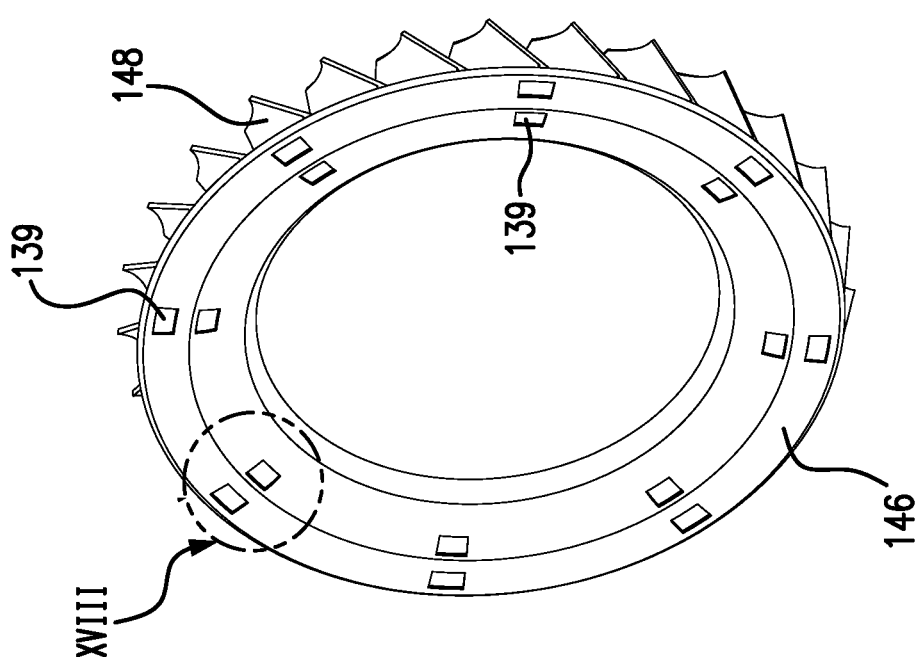
FIG. 17 is a perspective view of a component of the turbine assembly of the hydrokinetic torque converter of FIG. 14.
Figure 22:
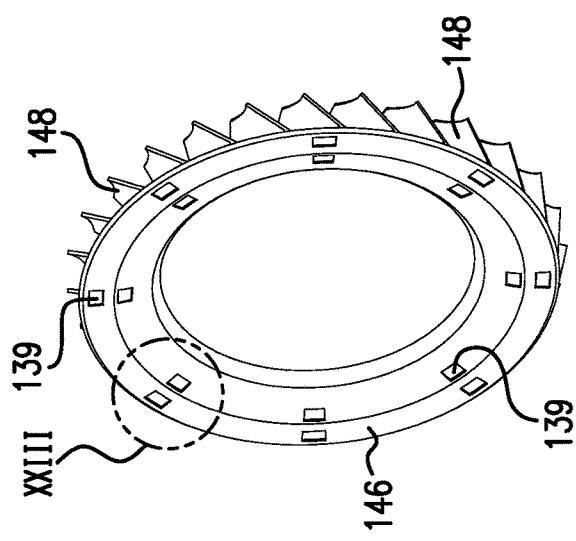
FIG. 22 is a side perspective view of a component of the turbine assembly of the second exemplary embodiment in a preassembled and pre-welded state.

FIG. 16 shows local areas of radially overlapping portions of the outer and inner turbine shell elements 138 and 146 at which ultrasonic welding has occurred. The inner turbine shell element 146 includes recessed areas (or recesses) 139, and the outer turbine shell element 138 includes tabs 147 received in and solid-state welded to the recessed areas 139 of the inner turbine shell element 146. As best shown in FIGS. 17 and 22, the recessed areas 139 may be circumferentially equiangularly spaced around the rear surface of the inner turbine shell element 146. In FIGS. 17, 18, 22, and 23, the recessed areas 139 are arranged in pairs of two, with the two recesses aligned along a common radial line. Alternatively, three, four, or more recesses 139 may be aligned together along the same radial line. As another alternative, only a single recess 139 may be located along a given radial line. Each of the tabs 147 is aligned with and received by a corresponding one of the recesses 139.

Figure 21:
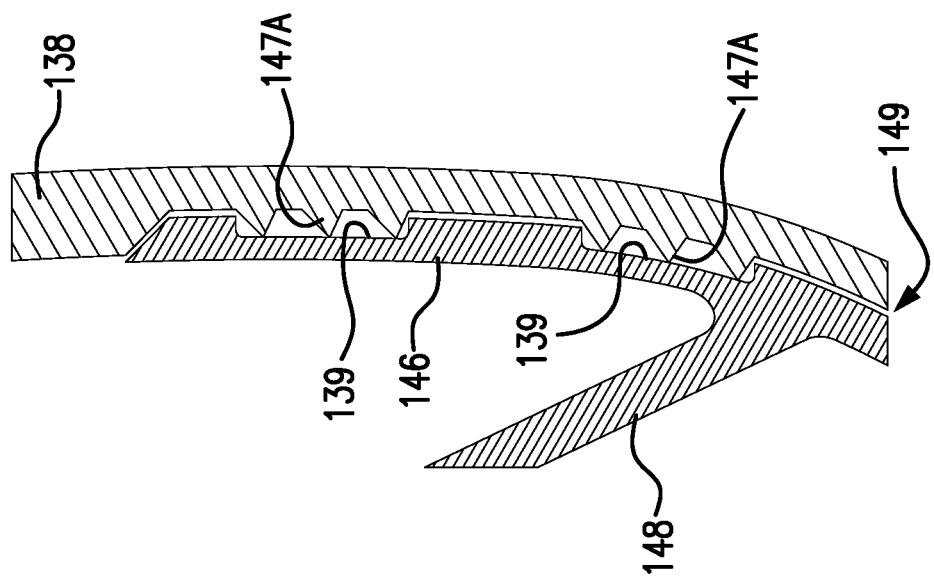
FIG. 21 is an enlarged view of a fragment of the turbine assembly shown in the box XXI of FIG. 20.
Figure 20:
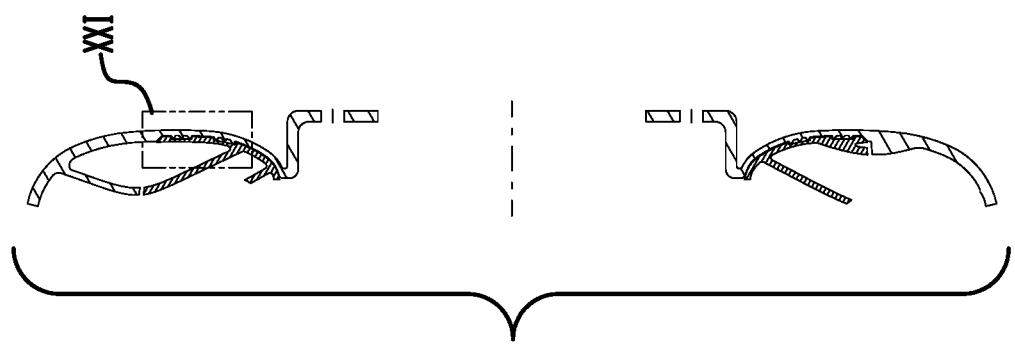
FIG. 20 is a full view in axial section of the turbine assembly of FIG. 19 in an assembled yet pre-welded state.
Figure 19:
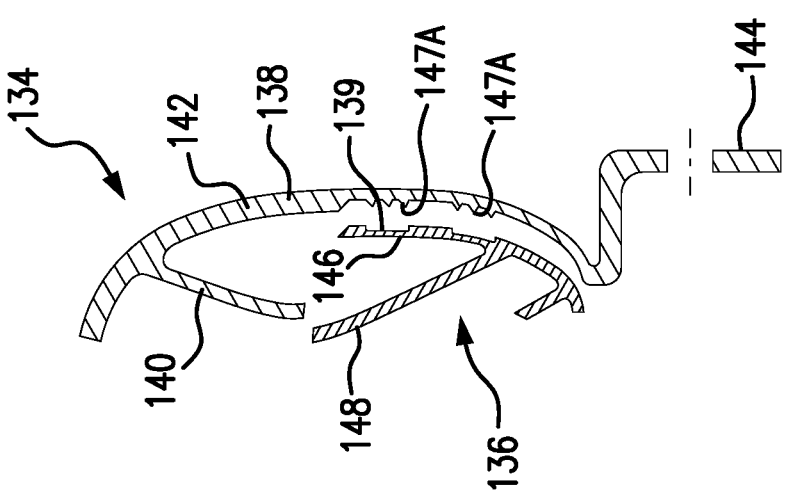
FIG. 19 is a side sectional view of the turbine assembly of the second exemplary embodiment shown in a pre-assembled state.

FIGS. 19-25 illustrate the outer and inner turbine components 134 and 136 prior to being welded and/or bonded to one another, such as by ultrasonic welding. As best shown in FIG. 25, prior to (ultrasonic) welding the tabs 147 are configured as molded protuberances 147A on a side surface of the outer turbine shell element 138 facing the inner turbine shell element 146. The protuberances 147A are in corresponding positions to the recesses 139 of the inner turbine shell element 146 that receive the protuberances 147A. As best shown in FIGS. 21 and 25, the protuberances 147A are each embodied in the second exemplary embodiment as parallel ridges separated by small inverse ridge-like, V-shaped spaces (unnumbered). The protuberances 147A have a thickness that is slightly greater than the depth of the recesses 139, so that the facing surfaces of the overlapping portions of the outer and inner turbine shell elements 138 and 146 are spaced from one another by a small gap 149 (FIG. 21) prior to welding.

Welding the outer turbine shell element 138 at local areas corresponding to the locations of the protuberances 147A cause the ridges of the protuberances 147A to soften and optionally melt. Pressure applied to opposite surfaces of the outer and inner turbine shell causes elements 138 and 146 to collapse the small gap 149 and cause the protuberances 147A reshape into the tabs 147 to conform to the shape of the recesses 139. The tabs 147 are then cooled and harden.

In the second exemplary embodiment, the outer turbine shell element 138, and more preferably the entirety of the outer turbine component 134, is made of one or more polymers that can be subject to (ultrasonic) welding to reshape the protuberances 147A into the tabs 147, as described above. Examples of suitable polymeric materials for the outer turbine component 134 are polyetheretherketone (PEEK), such as a carbon-fiber reinforced grade PEEK, a commercially available example of which is KetaSpire® KT-880 CF30. Preferably, the outer turbine shell element 138 and the radially outer turbine blades 140 of the outer turbine component 134 are integrally formed with one another as a single piece. For example, the outer turbine component 134 may be made by a suitable molding process, such as injection molding the outer turbine shell element 138 and the radially outer turbine blades 140 in a common mold.

In the second exemplary embodiment, the inner turbine component 136 is not subject to deformation. Accordingly, the inner turbine component 136 may be made of metal (e.g., aluminum or magnesium alloys) and/or polymeric material, such as the PEEK material discussed above. In this manner, the same or different materials can be selected for the outer turbine component 134 and the inner turbine component 136 to control mechanical characteristics, such as strengths, specific weights, densities, moduli of elasticity, melting points, etc.

As shown by comparing FIGS. 16 and 21, the outer turbine shell element 138 is made of a polymeric material in order to allow it to be reshaped and/or reformed in the welding process, particularly at the protuberances 147A, which are reshaped and/or reformed as the tabs 147 that fill and are welded to the recesses 139. On the other hand, the inner turbine shell element 146 is not necessarily reshaped and/or reformed in the welding process, particularly at the recesses 139 that receive the protuberances 147A that are welded to form the tabs 147, and thus can be made of metal or polymeric materials.

Molding of the outer and/or inner turbine components 134 and/or 136 provides wide latitude in controlling the thickness of the turbine components 134 and/or 136. For example, the outer turbine shell element 138 or the inner turbine shell element 146 can have thicknesses that varies at different radial positions. The outer and inner turbine shell element 138 and 146 may have thicknesses that differ from the thicknesses of the radially outer and radially inner turbine blades 140 and 148, respectively. The thicknesses of the radially outer turbine blades 140 or the radially inner turbine blades 148 may vary. The capability to control thickness provides the possibility for mass optimization by increasing thickness at locations where greater strength are needed and reducing thickness where strength is not needed to thereby reduce the overall weight of the turbine assembly 122. Further, molding provides the option of providing the molded turbine assembly 122 with molded reinforcing ribs.

The turbine assembly 122 and hydrodynamic torque coupling device 110 of the second exemplary embodiment may be made in accordance with the exemplary methods described above with respect to the first exemplary embodiment. Notably, the inner turbine shell element 146 of the inner turbine component 136 is axially aligned and non-moveably secured to the outer turbine shell element 138 of the outer turbine component 134 by welding and/or bonding, such as ultrasonic welding, friction welding, adhesive bonding, etc., so as to collectively define the turbine shell 130 of the turbine assembly 122.

Figure 28:
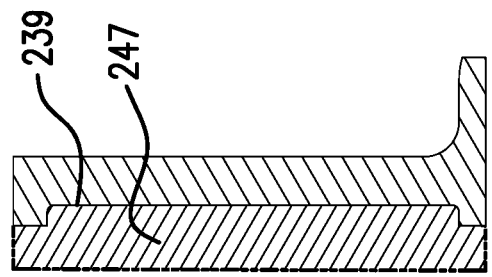
FIG. 28 is an enlarged view of a fragment shown in box XXVIII of FIG. 27.
Figure 27:
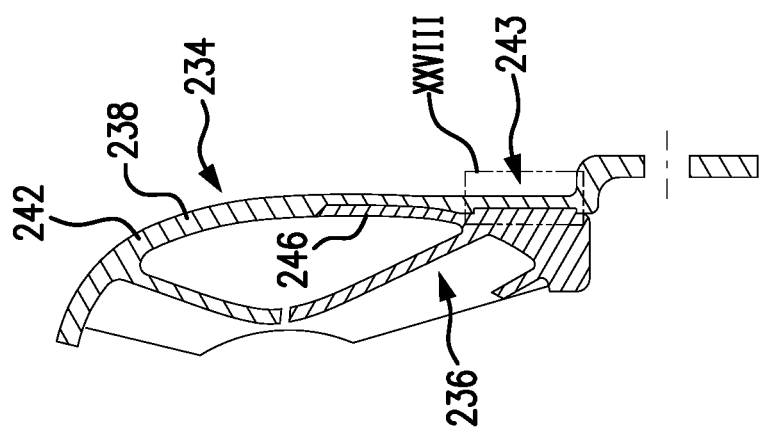
FIG. 27 is a sectional side view of the turbine components of the turbine assembly of FIG. 26 in an assembled and welded state.
Figure 26:
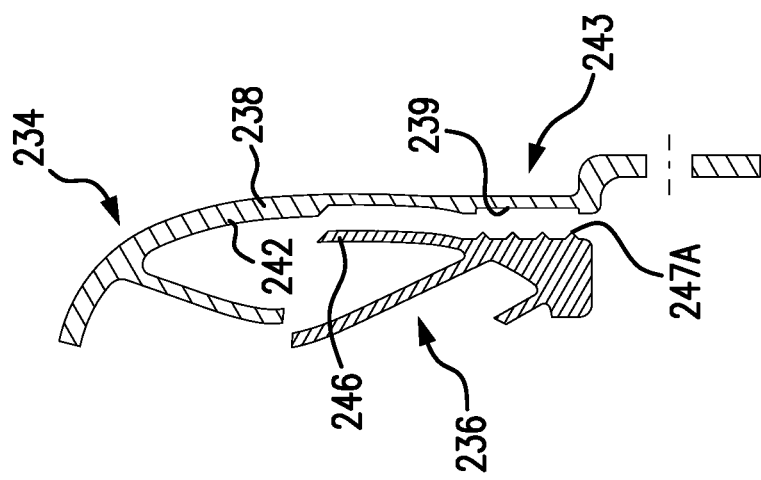
FIG. 26 is a half view in axial section of a turbine assembly of a hydrokinetic torque converter in accordance with a third exemplary embodiment of the present invention, the turbine assembly including turbine components illustrated in a pre-assembled and pre-welded state.

A turbine assembly 222 for a hydrokinetic torque-coupling device according to a third exemplary embodiment is illustrated in FIGS. 26-28. The turbine assembly 222 of the third exemplary embodiment is substitutable into the hydrokinetic torque coupling devices 10 and 110 described above. The primary differences between the turbine assembly 222 of the third exemplary embodiment and the turbine assembly 22 of the first exemplary embodiment are explained in detail below.

The turbine assembly 222 includes an outer turbine component 234 having an outer turbine shell element 238 with a substantially semi-toroidal portion 242 and a planar portion 243. Recesses 239 are provided in the planar radially inner portion 243, compared to the embodiment of FIGS. 1-13, in which the recesses 39 are provided in the substantially semi-toroidal portion 42. An inner turbine component 236 of the turbine assembly 222 includes an inner turbine shell element 246 having protuberances 247A. During assembly, the protuberances 247A are received in the recesses 239 of the planar radially inner portion 243 of the outer turbine shell element 238. The turbine assembly 222 is subjected to a welding or bonding technique, such as described above with respect to the first exemplary embodiment. In connection with welding, the protuberances 247A reshape and/or reform as tabs 247 in the recesses 239, as best shown in FIG. 28.

Figure 31:
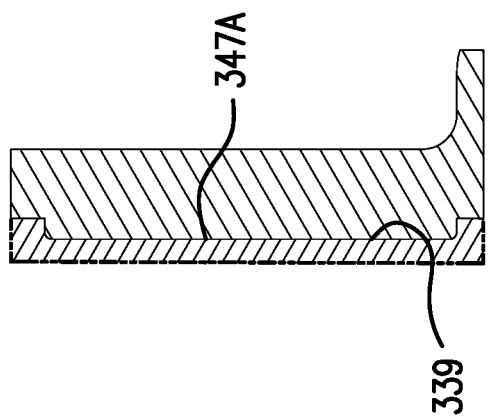
FIG. 31 is an enlarged view of a fragment shown in box XXXI of FIG. 30.
Figure 30:
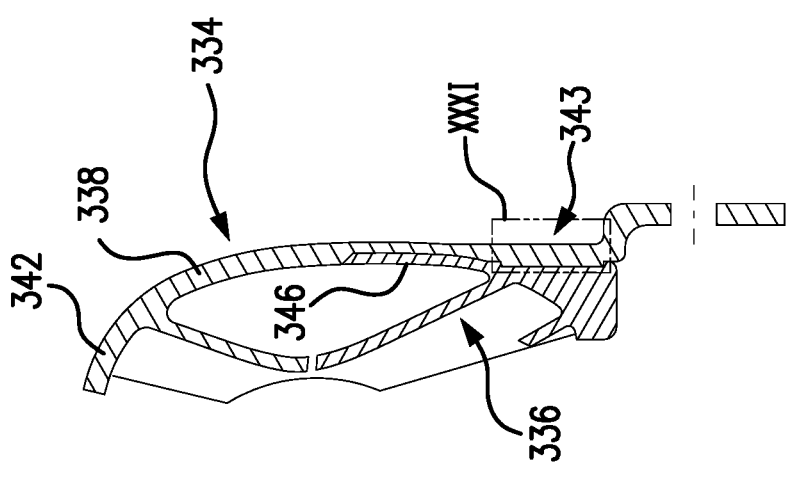
FIG. 30 is a sectional side view of the turbine components of the turbine assembly of FIG. 29 in an assembled and welded state.
Figure 29:
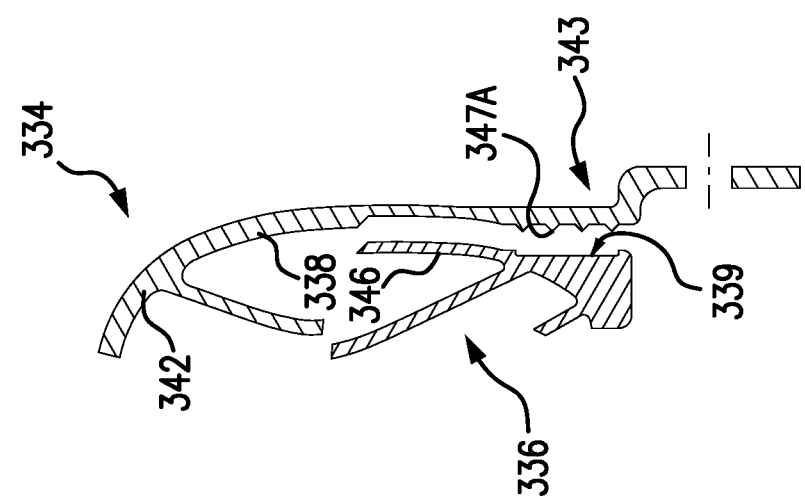
FIG. 29 is a half view in axial section of a turbine assembly of a hydrokinetic torque converter in accordance with a fourth exemplary embodiment of the present invention, the turbine assembly including turbine components illustrated in a pre-assembled and pre-welded state.

A turbine assembly 322 for a hydrokinetic torque-coupling device according to a fourth exemplary embodiment is illustrated in FIGS. 29-31. The turbine assembly 322 of the fourth exemplary embodiment is substitutable into the hydrokinetic torque coupling devices 10 and 110 described above. The primary differences between the turbine assembly 322 of the third exemplary embodiment and the turbine assembly 122 of the second exemplary embodiment are explained in detail below.

The turbine assembly 322 includes an outer turbine component 334 having an outer turbine shell element 338 with a substantially semi-toroidal portion 342 and a planar radially inner portion 343. Protuberances 347A are provided on the planar radially inner portion 243, compared to the embodiment of FIGS. 14-25, in which the recesses protuberances 147A are provided in the semi-toroidal portion 142. An inner turbine component 336 of the turbine assembly 322 includes an inner turbine shell element 346 having recesses 339 in positions corresponding to the protuberances 347A. During assembly, the protuberances 347A of the planar radially inner portion 343 of the outer turbine shell element 338 are received in the recesses 339 of the inner turbine shell element 346. The turbine assembly 322 is subjected to a welding or bonding technique, such as described above with respect to the second exemplary embodiment. Welding causes the protuberances 347A to reshape and/or reform as tabs 347 in the recesses 339, as best shown in FIG. 31.

The various components and features of the above-described exemplary embodiments may be substituted into one another in any combination. It is within the scope of the invention to make the modifications necessary or desirable to incorporate one or more components and features of any one embodiment into any other embodiment. In addition, although the exemplary embodiments discuss steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A method of making a turbine assembly for a hydrokinetic torque converter, the turbine assembly having a rotational axis, the method comprising:
   providing a first turbine component comprising a polymeric first turbine shell element and first turbine blades connected to the first turbine shell element;
   providing a second turbine component comprising a second turbine shell element and second turbine blades connected to the second turbine shell element, the first turbine blades and the second turbine blades being arranged to face toward the same axial direction; and
   connecting the first turbine shell element to the second turbine shell element to collectively provide a turbine shell of the turbine assembly and fixedly secure the first and second turbine components to one another in a coaxial relationship about the rotational axis, the connecting comprising welding the first turbine shell element to the second turbine shell element,
   wherein the first turbine shell element is positioned farther radially outward than the second turbine shell element and comprises protuberances,
   wherein the second turbine shell element comprises recesses, and
   wherein the connecting comprises positioning the protuberances in the recesses and reshaping the protuberances by welding into tabs that are solid-state welded to the recesses.

2. The method of claim 1, wherein the first turbine blades are polymeric and integrally formed with the first turbine shell element.

3. The method of claim 1, wherein the second turbine blades and the second turbine shell element are polymeric and integrally formed with one another.

4. The method of claim 1, wherein the second turbine blades and the second turbine shell element are metallic.

5. The method of claim 1, wherein the first turbine shell element and the second turbine shell element have variable thickness portions, and wherein the connecting comprises positioning the variable thickness portions in radially overlapping relationship with one another.

6. The method of claim 1, wherein the protuberances are circumferentially spaced about the first turbine shell element and the recesses are circumferentially spaced about the second turbine shell element in corresponding positions to the protuberances.

7. The method of claim 1, wherein the protuberances and the recesses are provided at substantially semi-toroidal radially outer portions of the first turbine shell element and the second turbine shell element, respectively.

8. The method of claim 1, wherein the protuberances and the recesses are provided at planar portions of the first turbine shell element and the second turbine shell element, respectively.

9. The method of claim 1, wherein the connecting comprises sonically welding the first turbine shell element to the second turbine shell element.

10. The method of claim 1, further comprising forming the first turbine component separately from the second turbine component.

11. The method of claim 1, wherein the first turbine shell element and the second turbine shell element are connected to one another without mechanical fasteners.

\* \* \* \* \*